(12) United States Patent
Tachibanada (10) Patent No.: US 10,281,011 B2
(45) Date of Patent: May 7, 2019

(54) AUTOMATIC TRANSMISSION

(71) Applicant: Honda Motor Co., Ltd., Tokyo (JP)

(72) Inventor: Yuya Tachibanada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 105 days.

(21) Appl. No.: 15/458,993

(22) Filed: Mar. 15, 2017

(65) Prior Publication Data

US 2017/0268633 A1    Sep. 21, 2017

(30) Foreign Application Priority Data

Mar. 15, 2016 (JP) .................................. 2016-051477

(51) Int. Cl.
| | |
|---|---|
| *F16H 3/66* | (2006.01) |
| *F16H 61/02* | (2006.01) |
| *F16H 61/12* | (2010.01) |
| *F16H 3/44* | (2006.01) |

(52) U.S. Cl.
CPC ........... *F16H 3/66* (2013.01); *F16H 61/0204* (2013.01); *F16H 61/12* (2013.01); *F16H 2003/442* (2013.01); *F16H 2200/0069* (2013.01); *F16H 2200/2012* (2013.01); *F16H 2200/2043* (2013.01); *F16H 2200/2048* (2013.01); *F16H 2200/2064* (2013.01); *F16H 2200/2066* (2013.01); *F16H 2200/2082* (2013.01); *F16H 2200/2094* (2013.01)

(58) Field of Classification Search
CPC .................. F16H 3/66; F16H 61/0204; F16H 2200/0069; F16H 2200/2012; F16H 2200/2043; F16H 2200/2066; F16H 2200/2082; F16H 2200/2064; F16H 2200/2094; B60W 10/02; B60W 10/11; B60W 10/115
See application file for complete search history.

(56) References Cited

U.S. PATENT DOCUMENTS

2014/0256497 A1*  9/2014  Ishikawa ................. F16H 61/16
                                                                475/269

FOREIGN PATENT DOCUMENTS

JP          2014-199080          10/2014

* cited by examiner

*Primary Examiner* — Mark J Beauchaine
(74) *Attorney, Agent, or Firm* — JCIPRNET (57) ABSTRACT

Provided is an automatic transmission with which a switching mechanism thereof is hardly damaged even if the hydraulic pressure supplied to a hydraulic pressure control circuit temporarily changes. A control part ECU of the automatic transmission TM switches the first brake B1 to the reverse rotation preventing state when a signal indicating that the slider is at a position corresponding to the reverse rotation preventing state is received while the control unit ECU recognized that it has switched the first brake B1 to the fixed state.

1 Claim, 10 Drawing Sheets

|  | B1 | B2 | B3 | B4 | C1 | C2 | C3 | Gear ratio | Common ratio |
|---|---|---|---|---|---|---|---|---|---|
| Rvs | E |  | O |  |  | O |  | 4.008 |  |
| 1st | R/F | O | O |  |  |  |  | 5.233 | 1.554 |
| 2nd | R | O | O |  |  |  | O | 3.367 | 1.465 |
| 3rd | R | O | O |  |  | O |  | 2.298 | 1.348 |
| 4th | R | O |  |  |  | O | O | 1.705 | 1.251 |
| 5th | R | O |  |  | O | O |  | 1.363 | 1.363 |
| 6th | R |  |  |  | O | O | O | 1.000 | 1.273 |
| 7th | R |  | O |  | O | O |  | 0.786 | 1.196 |
| 8th | R |  | O |  | O |  | O | 0.657 | 1.126 |
| 9th | R |  | O | O | O |  |  | 0.584 | 1.120 |
| 10th | R |  |  | O | O |  | O | 0.520 |  |

AUTOMATIC TRANSMISSION

CROSS-REFERENCE TO RELATED APPLICATION

This application claims the priority benefit of Japan application serial no. 2016-051477, filed on Mar. 15, 2016. The entirety of the above-mentioned patent application is hereby incorporated by reference herein and made a part of this specification.

BACKGROUND OF THE INVENTION

Field of the Invention

The invention relates to an automatic transmission that includes planetary gear mechanisms and engagement mechanisms.

Description of Related Art

An automatic transmission that includes planetary gear mechanisms having multiple elements rotatable inside a casing, and multiple engagement mechanisms switchable to a coupled state in which the elements are coupled to one another, or switchable to a fixed state in which the elements are fixed to the casing has been known.

As one of the engagement mechanism, it has been known that such an automatic transmission uses a switching mechanism (a two-way clutch, for example) that is switchable between the fixed state and the reverse rotation preventing state which allows the normal rotation and prevents the reverse rotation of the elements of the planetary gear mechanisms. In such a switching mechanism, a hydraulic pressure control circuit, etc. perform the switching (refer to Patent Literature 1, for example).

PRIOR ART LITERATURE

Patent Literature

Patent Literature 1: Japanese Unexamined Patent Publication No. 2014-199080.

SUMMARY OF THE INVENTION

Problem to be Solved

With a conventional automatic transmission, such as the one described in Patent Literature 1, however, hydraulic pressure supplied to the hydraulic pressure control circuit may temporarily change because of an influence such as oil vibration. Therefore, it may occur that although the control part recognizes that the switching mechanism is in the fixed state, the switching mechanism is actually in the reverse rotation preventing state.

Under such a circumstance, the differential rotation may occur as the same as in the normal released state. Because the switching mechanism is in the fixed state in terms of the control, when the temporary change of the hydraulic pressure is resolved, the switching mechanism is forcibly switched to the fixed state even though the differential rotation is occurring. As a result, components of the switching mechanism may be broken, and thus the switching mechanism may be damaged.

Solution to the Problem

The disclosure provides an automatic transmission with which the switching mechanism is hardly damaged even if the hydraulic pressure supplied to the hydraulic pressure control circuit temporary changes.

An automatic transmission according to the disclosure includes an input member disposed inside a casing and rotated by driving force transmitted from a drive source, a planetary gear mechanism having a plurality of elements rotatable inside the casing, a plurality of engagement mechanisms switchable to a coupled state in which each of the elements are coupled to one another or switchable to a fixed state in which the elements are fixed to the casing, an output member outputting rotation, and a control part controlling the engagement mechanisms. The automatic transmission is capable of outputting the rotation of the input member to the output member while changing speed in a plurality of gear positions with the planetary gear mechanism and the engagement mechanisms. The automatic transmission further includes a hydraulic pressure control circuit switching the engagement mechanisms according to a hydraulic pressure supplied according to a signal from the control part. The hydraulic pressure control circuit has a slider movable when the hydraulic pressure is supplied and a stroke sensor recognizing the position of the slider and transmitting a signal indicating that the slider is at the abovementioned position to the control part. The plurality of engagement mechanisms includes a switching mechanism switchable between the fixed state and a reverse rotation preventing state that allows the normal rotation and prevents the reverse rotation of a corresponding element among the plurality of elements. The switching mechanism is switched between the reverse rotation preventing state and the fixed state by the movement of the slider. The control part switches the switching mechanism to the reverse rotation preventing state when a signal indicating that the slider is moving from a position corresponding to the fixed state to another position corresponding to the reverse rotation preventing state is received while the control part recognizes that the switching mechanism has been switched to the fixed state.

The control part of the automatic transmission according to the disclosure switches the switching mechanism to the reverse rotation preventing state when a signal indicating that the slider is moving from the position corresponding to the fixed state to the position corresponding to the reverse rotation preventing state is received due to an abnormality such as a temporary change in the hydraulic pressure supplied to the hydraulic pressure control circuit (that is, when the switching mechanism may become the reverse rotation preventing state) occurred while the control part recognizes that the switching mechanism has been switched to the fixed state.

Therefore, the slider remains at the position corresponding to the reverse rotation preventing state after the cause of the abnormality is resolved. As a result, the slider is not forcibly moved to the fixed state (that is, the switching mechanism is not forcibly switched to the fixed state) while the differential rotation is occurring in the switching mechanism. That is, the components of the switching mechanism are hardly damaged under such a circumstance.

Accordingly, the automatic transmission according to the disclosure hardly causes breakage to the switching mechanism even if the hydraulic pressure supplied to the hydraulic pressure control circuit temporarily changes.

BRIEF DESCRIPTION OF THE DRAWINGS

FIGS. 9A and 9B are explanatory diagrams illustrating the hydraulic pressure control circuit performing switching of the two-way clutch of the automatic transmission of FIG. 1. FIG. 9A illustrates the case where the two-way clutch is switched to the fixed state, and FIG. 9B illustrates the case where the two-way clutch is switched to the reverse rotation preventing state.

DESCRIPTION OF THE EMBODIMENTS

An automatic transmission according to an embodiment is described hereinafter with reference to the drawings. The embodiment describes the case where the automatic transmission is mounted on a vehicle, but the automatic transmission according to the disclosure may be mounted on other vehicles such as a vessel or an unmanned machine.

Figure 1:
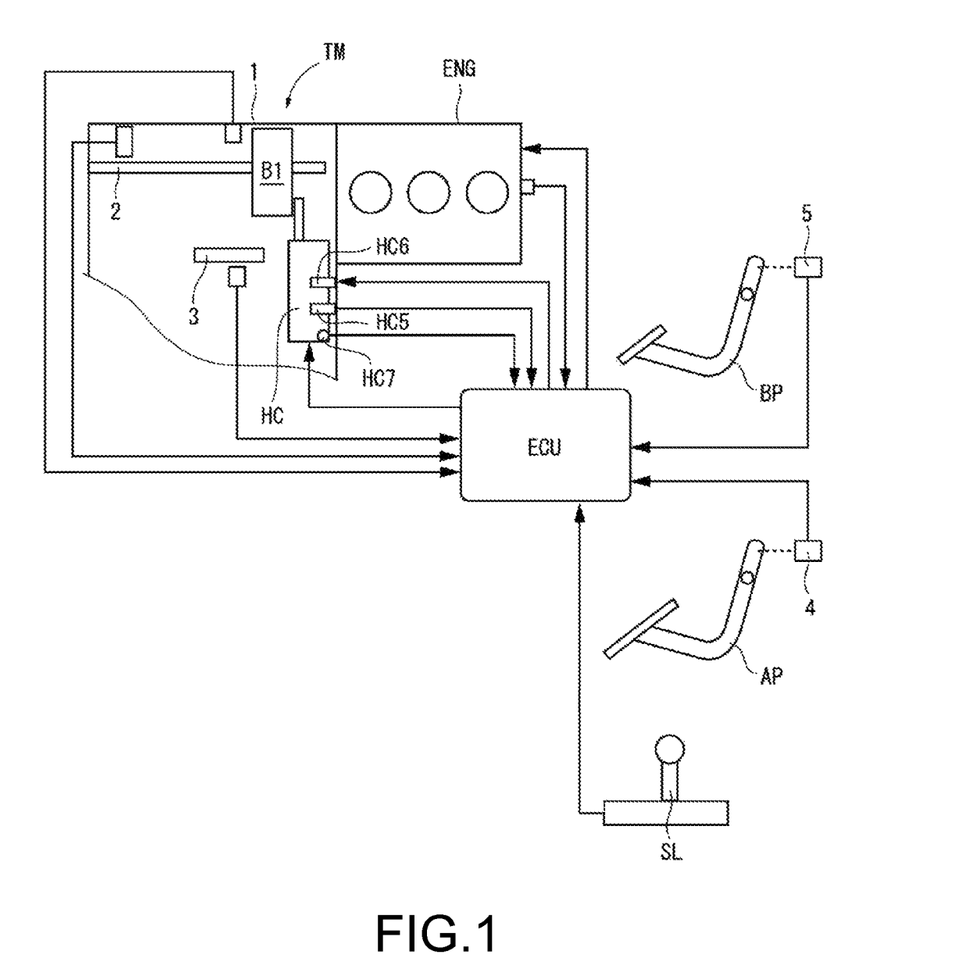
FIG. 1 is a schematic diagram illustrating a configuration of an automatic transmission according to the embodiment.
Figure 2:
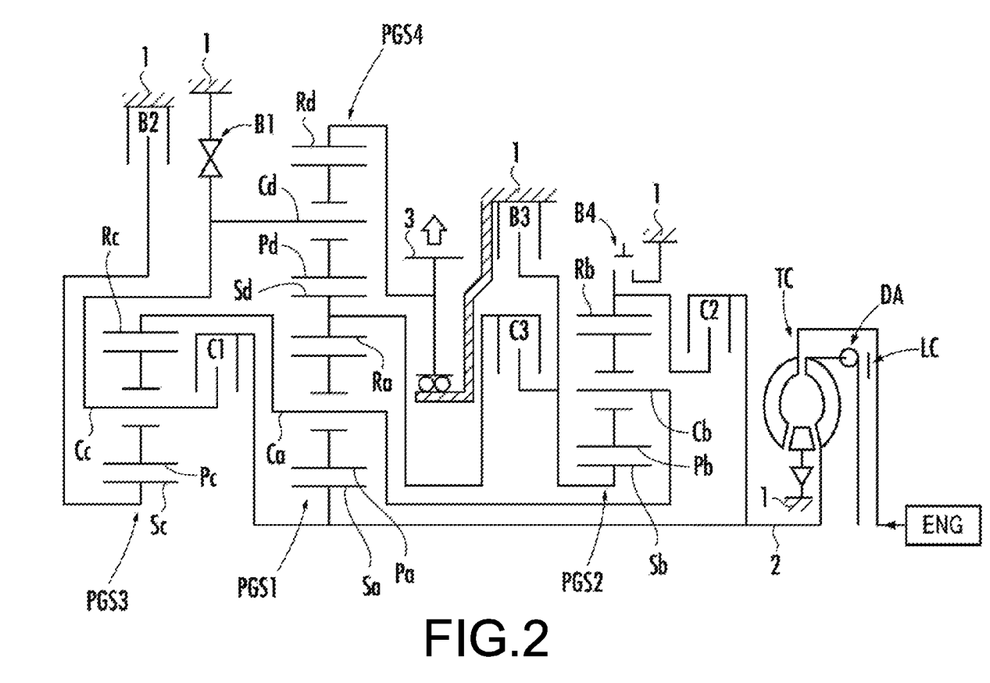
FIG. 2 is a skeleton diagram of the automatic transmission of FIG. 1.

Firstly, referring to FIGS. 1 and 2, the schematic configuration of an automatic transmission TM is described. FIG. 1 is schematic diagram illustrating a configuration of the automatic transmission TM. FIG. 2 is a skeleton diagram of the automatic transmission TM.

As shown in FIG. 1, the automatic transmission TM includes a transmission case 1 (casing), an input shaft 2 (input member) pivotally supported to be rotatable inside the transmission case 1 and an output gear 3 (output member) pivotally supported to be rotatable concentrically with the input shaft 2 inside the transmission case 1.

Also, the vehicle on which the automatic transmission TM is mounted includes a shift lever SL capable of switching the shift position to any of the forward range, the neutral range and the reverse range, an accelerator opening detector 4 detecting the on/off state of an accelerator pedal AP, and a brake pedal detector 5 detecting the on/off state of a brake pedal BP.

As shown in FIG. 2, driving force output by a drive source ENG such as an internal combustion engine (engine) is transmitted to the input shaft 2 via a torque converter TC. The torque converter TC has a lock-up clutch LC and a dumper DA. A start clutch of a single-plate type or a multi-plate type configured to be frictionally engageable may be disposed instead of the torque converter TC.

The rotation of the output gear 3 is transmitted to driving wheels disposed on the left and right sides of the vehicle via a differential gear (not depicted) or a propeller shaft (not depicted).

Inside the transmission case 1, four planetary gear mechanisms, which are the first planetary gear mechanism PGS1, the second planetary gear mechanism PGS2, the third planetary gear mechanism PGS3 and the fourth planetary gear mechanism PGS4, are disposed concentrically with the input shaft 2.

Also, seven engagement mechanisms, which are the first clutch C1, the second clutch C2, the third clutch C3, the first brake B1, the second brake B2, the third brake B3 and the fourth brake B4, are disposed inside the transmission case 1.

Figure 3:
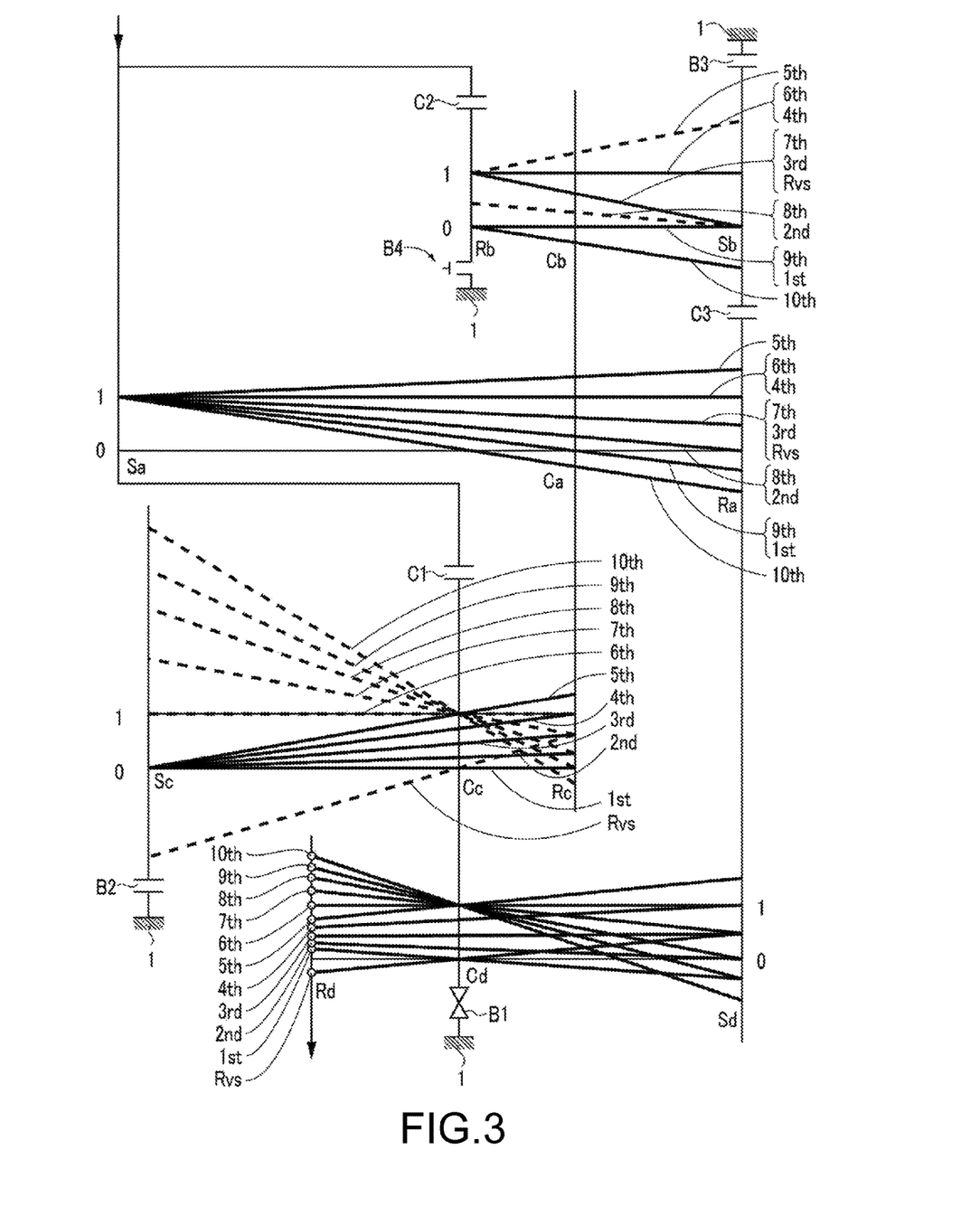
FIG. 3 is a collinear chart of the planetary gear mechanisms of the automatic transmission of FIG. 1.

Next, referring to FIG. 3, the four planetary gear mechanisms and the seven engagement mechanisms included in the automatic transmission TM are described.

A collinear chart (a chart that can indicate the relative rotational speed ratio of three elements of the planetary gear mechanisms as straight lines (velocity diagram)) in FIG. 3 indicates the collinear chart of the second planetary gear mechanism PGS2, of the first planetary gear mechanism PGS1 of the third planetary gear mechanism PGS3 and of the fourth planetary gear mechanism PGS4, in order from the top of the chart.

The first planetary gear mechanism PGS1 is constituted with a so-called planetary gear mechanism of a single pinion type including a sun gear Sa, a ring gear Ra and a carrier Ca that pivotally supports a pinion Pa engaging with the sun gear Sa and the ring gear Ra to be rotatable and revoluvable.

A planetary gear mechanism of a single pinion type such as the planetary gear mechanism PGS1 is also called as a minus planetary gear mechanism or a negative planetary gear mechanism because the ring gear rotates in the different direction to the sun gear when the sun gear is rotated while the carrier is fixed. In this planetary gear mechanism, the carrier and the sun gear rotate in the same direction when the sun gear is rotated while the ring gear is fixed.

As shown in the second section from the top of the collinear chart in FIG. 3, if the three elements, Sa, Ca and Ra, of the first planetary gear mechanism PGS1 are indicated as the first element, the second element and the third element respectively from the left (a side) in the order of the intervals corresponding to the gear ratios (the number of teeth of the ring gear/the number of teeth of the sun gear) in the collinear chart, the first element is the sun gear Sa, and the second element is the carrier Ca, and the third element is the ring gear Ra.

The ratio of the interval between the sun gear Sa and the carrier Ca and the interval between the carrier Ca and the ring gear Ra is set to h:1 as h indicates the gear ratio of the first planetary gear mechanism PGS1.

The second planetary gear mechanism PGS2 is also constituted with a so-called planetary gear mechanism of a single pinion type including a sun gear Sb, a ring gear Rb and a carrier Cb that pivotally supports a pinion Pb engaging with the sun gear Sb and the ring gear Rb to be rotatable and revoluvable, as the same as the first planetary gear mechanism PGS1.

As shown in the first (uppermost) section from the top of the collinear chart in FIG. 3, if the three elements, Sb, Cb and Rb, of the second planetary gear mechanism PGS2 are indicated as the fourth element, the fifth element and the sixth element respectively from the left (a side) in the order of the intervals corresponding to the gear ratios in the collinear chart, the fourth element is the ring gear Rb, and the fifth element is the carrier Cb, and the sixth element is the sun gear Sb.

The ratio of the interval between the sun gear Sb and the carrier Cb and the interval between the carrier Cb and the ring gear Rb is set to i:1 as i indicates the gear ratio of the second planetary gear mechanism PGS2.

The third planetary gear mechanism PGS3 is also constituted with a so-called planetary gear mechanism of a single pinion type including a sun gear Sc, a ring gear Rc and a carrier Cc that pivotally supports a pinion Pc engaging with the sun gear Sc and the ring gear Rc to be rotatable and revoluvable, as the same as the first planetary gear mechanism PGS1 and the second planetary gear mechanism PGS2.

As shown in the third section from the top of the collinear chart in FIG. 3, if the three elements, Sc, Cc and Rc, of the third planetary gear mechanism PGS3 are indicated as the seventh element, the eighth element and the ninth element respectively from the left (a side) in the order of the intervals corresponding to the gear ratios in the collinear chart, the seventh element is the sun gear Sc, and the eighth element is the carrier Cc, and the ninth element is the ring gear Rc.

The ratio of the interval between the sun gear Sc and the carrier Cc and the interval between the carrier Cc and the ring gear Rc is set to j:1 as j indicates the gear ratio of the third planetary gear mechanism PGS3.

The fourth planetary gear mechanism PGS4 is also constituted with a so-called planetary gear mechanism of a single pinion type including a sun gear Sd, a ring gear Rd and a carrier Cd that pivotally supports a pinion Pd engaging with the sun gear Sd and the ring gear Rd to be rotatable and revoluvable, as the same as the first planetary gear mechanism PGS1, the second planetary gear mechanism PGS2 and the third planetary gear mechanism PGS3.

As shown in the fourth (lowermost) section from the top of the collinear chart in FIG. 3, if the three elements, Sd, Cd and Rd, of the fourth planetary gear mechanism PGS4 are indicated as the tenth element, the eleventh element and the twelfth element respectively from the left in the order of the intervals corresponding to the gear ratios in the collinear chart, the tenth element is the ring gear Rd, and the eleventh element is the carrier Cd, and the twelfth element is the sun gear Sd.

The ratio of the interval between the sun gear Sd and the carrier Cd and the interval between the carrier Cd and the ring gear Rd is set to k:1 as k indicates the gear ratio of the fourth planetary gear mechanism PGS4.

The sun gear Sa (the first element) of the first planetary gear mechanism PGS1 is coupled to the input shaft 2 (input member). The ring gear Rd (the tenth element) of the fourth planetary gear mechanism PGS4 is coupled to the output gear 3 (output member).

Also, the carrier Ca (the second element) of the first planetary gear mechanism PGS1, the carrier Cb (the fifth element) of the second planetary gear mechanism PGS2 and the ring gear Rc (the ninth element) of the third planetary gear mechanism PGS3 are coupled and constitute the first coupled body Ca-Cb-Rc. The ring gear Ra (the third element) of the first planetary gear mechanism PGS1 and the sun gear Sd (the twelfth element) of the fourth planetary gear mechanism PGS4 are coupled and constitute the second coupled body Ra-Sd. The carrier Cc (the eighth element) of the third planetary gear mechanism PGS3 and the carrier Cd (the eleventh element) of the fourth planetary gear mechanism PGS4 are coupled and constitute the third coupled body Cc-Cd.

The first clutch C1 is a wet multiple-disk friction clutch of a hydraulic actuation type. The first clutch C1 is configured to be switchable between the coupled state in which the sun gear Sa (the first element) of the first planetary gear mechanism PGS1 and the third coupled body Cc-Cd are coupled and the released state in which the sun gear Sa and the third coupled body Cc-Cd are uncoupled.

The second clutch C2 is a wet multiple-disk friction clutch of a hydraulic actuation type. The second clutch C2 is configured to be switchable between the coupled state in which the sun gear Sa (the first element) of the first planetary gear mechanism PGS1 and the ring gear Rb (the fourth element) of the second planetary gear mechanism PGS2 are coupled and the released state in which the sun gear Sa and the ring gear Rb are uncoupled.

The third clutch C3 is a wet multiple-disk friction clutch of a hydraulic actuation type. The third clutch C3 is configured to be switchable between the coupled state in which the sun gear Sb (the sixth element) of the second planetary gear mechanism PGS2 and the second coupled body Ra-Sd are coupled and the released state in which the sun gear Sb and the second coupled body Ra-Sd are uncoupled.

The first brake B1 is a so-called two-way clutch. The first brake B1 is configured to be switchable between the reverse rotation preventing state which allows the normal rotation (the rotation in the same direction as the rotational direction of the input shaft 2) and prevents the reverse rotation of the third coupled body Cc-Cd and the fixed state in which the third coupled body Cc-Cd is fixed to the transmission case 1.

In the reverse rotation preventing state, the rotation of the first brake B1 is allowed when the force to rotate the third coupled body Cc-Cd in the normal direction is applied, and the rotation of the first brake B1 is prevented and the first brake B1 is fixed to the transmission case 1 when the force to rotate the third coupled body Cc-Cd in the reverse direction is applied.

In the fixed state, the rotation of the first brake B1 is prevented and the first brake B1 is fixed to the transmission case 1 in either case where the force to rotate the third coupled body Cc-Cd in the non al direction or in the reverse direction is applied.

The second brake B2 is a wet multiple-disk friction brake of a hydraulic actuation type. The second brake B2 is configured to be switchable between the fixed state in which the sun gear Sc (the seventh element) of the third planetary gear mechanism PGS3 is fixed to the transmission case 1 and the released state in which the sun gear Sc is released from the transmission case 1.

The third brake B3 is a wet multiple-disk friction brake of a hydraulic actuation type. The third brake B3 is configured to be switchable between the fixed state in which the sun gear Sb (the sixth element) of the second planetary gear mechanism PGS2 is fixed to the transmission case 1 and the released state in which the sun gear Sb is released from the transmission case 1.

The fourth brake B4 is an engagement mechanism constituted with a dog clutch or a synchromesh mechanism having a synchronization function. The fourth brake B4 is configured to be switchable between the fixed state in which the ring gear Rb (the fourth element) of the second planetary gear mechanism PGS2 is fixed to the transmission case 1 and the released state in which the ring gear Rb is released from the transmission case 1.

The control part ECU (refer to FIG. 1) including a transmission control unit switches the state of the first clutch C1, the second clutch C2, the third clutch C3, the first brake B1, the second brake B2, the third brake B3 and the fourth brake B4 based on vehicle information such as the travelling speed of the vehicle.

As shown in FIG. 2, the second clutch C2, the second planetary gear mechanism PGS2, the third clutch C3, the output gear 3, the first planetary gear mechanism PGS1, the first clutch C1 and the third planetary gear mechanism PGS3 are disposed on the axis line of the input shaft 2 in this order from the side of the driving source ENG and the torque converter TC.

The fourth brake B4 is disposed outside in the radial direction of the second planetary gear mechanism PGS2. The third brake B3 is disposed outside in the radial direction of the third clutch C3. The first brake B1 is disposed outside in the radial direction of the first clutch C1. The second brake B2 is disposed outside in the radial direction of the third planetary gear mechanism PGS3.

As such, in the automatic transmission TM, the axial length of the automatic transmission is shortened by disposing the four brakes outside in the radial direction of the planetary gear mechanisms or the clutches, compared to an automatic transmission disposing the brakes on the axis line of the input shaft 2 together with the planetary gear mechanisms and the clutches. The fourth brake B4 may be disposed outside in the radial direction of the second clutch C2, and the third brake B3 may be disposed outside in the radial direction of the second planetary gear mechanism PGS2.

Also, the fourth planetary gear mechanism PGS4 is disposed outside in the radial direction of the first planetary gear mechanism PGS1. The ring gear Ra (the third element) of the first planetary gear mechanism PGS1 and the sun gear Sd (the twelfth element) of the fourth planetary gear mechanism PGS4 are integrally coupled and constitute the second coupled body Ra-Sd.

As such, in the automatic transmission TM, the axial length of the automatic transmission is shortened by disposing the fourth planetary gear mechanism PGS4 outside in the radial direction of the first planetary gear mechanism PGS1 so that the first planetary gear mechanism PGS1 and the fourth planetary gear mechanism PGS4 are overlapped in the radial direction.

The axial length can be shortened when the first planetary gear mechanism PGS1 and the fourth planetary gear mechanism PGS4 are overlapped at least partially in the radial direction, and the axial length can be shortest when both the first planetary gear mechanism PGS1 and the fourth planetary gear mechanism PGS4 are completely overlapped in the radial direction.

Figure 4:
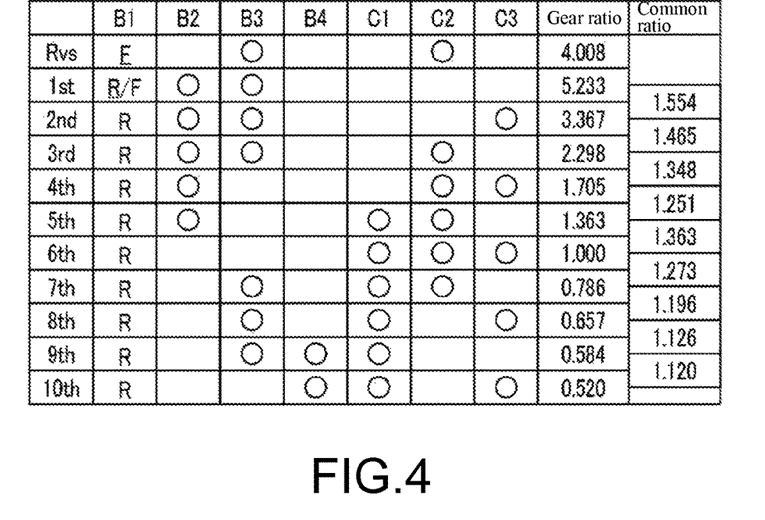
FIG. 4 is a diagram describing the state of the engagement mechanisms at each gear position of FIG. 1.

Next, referring to FIGS. 3 and 4, the state of the engagement mechanisms (that is, the first clutch C1, the second clutch C2, the third clutch C3, the first brake B1, the second brake B2, the third brake B3 and the fourth brake B4) when each gear position is established in the automatic transmission TM is described.

In the collinear chart of FIG. 3, the lower horizontal line and the upper horizontal line in each section (for example, the line overlapped with the collinear line 4th and 6th in the first planetary gear mechanism PGS1 of the second section from the top of the FIG. 3) respectively indicate the rotational speed of "0" and "1" (the same rotational speed as the input shaft 2, which is the input member).

Also, in the collinear chart of FIG. 3, the velocity diagram illustrated by broken lines indicates that each element of the planetary gear mechanisms other than the planetary gear mechanism transmitting power among the first planetary gear mechanism PGS1, the second planetary gear mechanism PGS2, the third planetary gear mechanism PGS3 and the fourth planetary gear mechanism PGS4 rotates (idles) following the planetary gear mechanism transmitting power.

The table shown as FIG. 4 summarizes the states of the engagement mechanisms at each gear position, and the symbol "o" indicates that the engagement mechanism of the corresponding column is in the coupled state or the fixed state, and absence of the symbol indicates that the engagement mechanism of the corresponding column is in the released state.

In FIG. 4, "R" in the column of the first brake B1 indicates that the first brake B1 is in the reverse rotation preventing state, and "F" in the same column indicates that the first brake B1 is in the fixed state.

In FIG. 4, "R" with the underline indicates that the rotational speed of the third coupled body Cc-Cd or the sun gear Sc (the seventh element) of the third planetary gear mechanism PGS3 becomes "0" by the operation of the first brake B1. Also, "R/F" indicates that it is "R", which means in the reverse rotation preventing state in the usual condition, but switched to "F", which means in the fixed state or the normal rotation preventing state, when applying the engine braking.

As shown in FIG. 4, when establishing the first gear position in the automatic transmission TM, the first brake B1, which is a two-way clutch, is set to the reverse rotation preventing state, and the second brake B2 and the third brake B3 is set to the fixed state.

By setting the first brake B1 to the reverse rotation preventing state, the reverse rotation of the third coupled body Cc-Cd and the sun gear Sc (the seventh element) of the third planetary gear mechanism PGS3 is prevented, and the rotational speed of the third coupled body Cc-Cd and the sun gear Sc (the seventh element) of the third planetary gear mechanism PGS3 becomes "0". Then, the sun gear Sc (the seventh element), the carrier Cc (the eighth element) and the ring gear Rc (the ninth element) of the third planetary gear mechanism PGS3 become in the locked state in which these elements cannot relatively rotate, and the rotational speed of the first coupled body Ca-Cb-Rc, which includes the ring gear Rc (the ninth element) of the third planetary gear mechanism PGD3, also becomes "0".

Thereby, the rotational speed of the ring gear Rd (the tenth element) of the fourth planetary gear mechanism PGS4 coupled to the output gear 3 becomes "1st" shown in FIG. 3, and the first gear position is established. To apply the engine braking at the first gear position, the first brake B1 may be switched to the fixed state.

It is not necessary to set the third brake B3 to the fixed state to establish the first gear position. However, the third brake B3 is set to the fixed state here for smoothly shifting from the first gear position to the second gear position described below.

To establish the second gear position, the first brake B1, which is a two-way clutch, is set to the reverse rotation preventing state, the second brake B2 and the third brake B3 are set to the fixed state, and the third clutch C3 is set to the coupled state.

By setting the first brake B1 to the reverse rotation preventing state, the normal rotation of the third coupled body Cc-Cd is allowed. By setting the second brake B2 to the fixed state, the rotational speed of the sun gear Sc (the seventh element) of the third planetary gear mechanism PGS3 becomes "0". By setting the third brake B3 to the fixed state, the rotational speed of the sun gear Sb (the sixth element) of the second planetary gear mechanism PGS2 becomes "0".

By setting the third clutch C3 to the coupled state, the rotational speed of the second coupled body Ra-Sd becomes "0", which is the same as the rotational speed of the sun gear Sb (the sixth element) of the second planetary gear mechanism PGS2.

Thereby, the rotational speed of the ring gear Rd (the tenth element) of the fourth planetary gear mechanism PGS4 coupled to the output gear 3 becomes "2nd" shown in FIG. 3, and the second gear position is established.

To establish the third gear position, the first brake B1, which is a two-way clutch, is set to the reverse rotation preventing state, the second brake B2 and the third brake B3 are set to the fixed state, and the second clutch C2 is set to the coupled state.

By setting the first brake B1 to the reverse rotation preventing state, the normal rotation of the third coupled body Cc-Cd is allowed. By setting the second brake B2 to the fixed state, the rotational speed of the sun gear Sc (the seventh element) of the third planetary gear mechanism PGS3 becomes "0". By setting the third brake B3 to the fixed state, the rotational speed of the sun gear Sb (the sixth element) of the second planetary gear mechanism PGS2 becomes "0".

By setting the second clutch C2 to the coupled state, the rotational speed of the ring gear Rb (the fourth element) of the second planetary gear mechanism PGS2 becomes "1", which is the same as the rotational speed of the sun gear Sa (the first element) of the first planetary gear mechanism PGS1 coupled to the input shaft 2. The rotational speed of the carrier Cb (the fifth element), that is, the rotational speed of the first coupled body Ca-Cb-Rc becomes $i/(i+1)$ because the rotational speed of the sun gear Sb (the sixth element) of the second planetary gear mechanism PGS2 becomes "0" and the rotational speed of the ring gear Rb (the fourth element) becomes "1".

Thereby, the rotational speed of the ring gear Rd (the tenth element) of the fourth planetary gear mechanism PGS4 coupled to the output gear 3 becomes "3rd" shown in FIG. 3, and the third gear position is established.

To establish the fourth gear position, the first brake B1, which is a two-way clutch, is set to the reverse rotation preventing state, the second brake B2 is set to the fixed state, and the second clutch C2 and the third clutch C3 are set to the coupled state.

By setting the first brake B1 to the reverse rotation preventing state, the normal rotation of the third coupled body Cc-Cd is allowed. By setting the second brake B2 to the fixed state, the rotational speed of the sun gear Sc (the seventh element) of the third planetary gear mechanism PGS3 becomes "0".

By setting the third clutch C3 to the coupled state, the sun gear Sb (the sixth element) of the second planetary gear mechanism PGS2 and the second coupled body Ra-Sd rotate at the same speed. At this time, the carrier Ca (the second element) and the carrier Cb (the fifth element) are coupled, and the ring gear Ra (the third element) and the sun gear Sb (the sixth element) are coupled between the first planetary gear mechanism PGS1 and the second planetary gear mechanism PGS2. Therefore, in the fourth gear position which sets the third clutch C3 to the coupled state, a single collinear chart consisting of four elements can be depicted for the first planetary gear mechanism PGS1 and the second planetary gear mechanism PGS2.

By setting the second clutch C2 to the coupled state, the rotational speed of the ring gear Rb (the fourth element) of the second planetary gear mechanism PGS2 becomes "1", which is the same as the rotational speed of the sun gear Sa (the first element) of the first planetary gear mechanism PGS1, and the rotational speed of two elements out of the four elements constituting the first planetary gear mechanism PGS1 and the second planetary gear mechanism PGS2 becomes "1". Accordingly, each of the elements of the first planetary gear mechanism PGS1 and the second planetary gear mechanism PGS2 becomes in the locked state in which these elements cannot relatively rotate, and the rotational speed of all the elements of the first planetary gear mechanism PGS1 and the second planetary gear mechanism PGS2 becomes "1".

Thereby, the rotational speed of the third coupled body Cc-Cd becomes $j/(j+1)$ and the rotational speed of the ring gear Rd (the tenth element) of the fourth planetary gear mechanism PGS4 coupled to the output gear 3 becomes "4th" shown in FIG. 3, and the fourth gear position is established.

To establish the fifth gear position, the first brake B1, which is a two-way clutch, is set to the reverse rotation preventing state, the second brake B2 is set to the fixed state, and the first clutch C1 and the second clutch C2 are set to the coupled state.

By setting the first brake B1 to the reverse rotation preventing state, the normal rotation of the third coupled body Cc-Cd is allowed. By setting the second brake B2 to the fixed state, the rotational speed of the sun gear Sc (the seventh element) of the third planetary gear mechanism PGS3 becomes "0".

By setting the first clutch C1 to the coupled state, the rotational speed of the third coupled body Cc-Cd becomes "1", which is the same as the rotational speed of the sun gear Sa (the first element) of the first planetary gear mechanism PGS1.

Thereby, the rotational speed of the ring gear Rd (the tenth element) of the fourth planetary gear mechanism PGS4 coupled to the output gear 3 becomes "5th" shown in FIG. 3, and the fifth gear position is established.

It is not necessary to set the second clutch C2 to the coupled state to establish the fifth gear position. However, because the second clutch C2 needs to be set to the coupled state in the fourth gear position and the sixth gear position, which is described later, the second clutch C2 is set to the coupled state here in the fifth gear position for smoothly downshifting from the fifth gear position to the fourth gear position or upshifting from the fifth gear position to the sixth gear position described below.

To establish the sixth gear position, the first brake B1, which is a two-way clutch, is set to the reverse rotation preventing state, and the first clutch C1, the second clutch C2 and the third clutch C3 are set to the coupled state.

By setting the first brake B1 to the reverse rotation preventing state, the normal rotation of the third coupled body Cc-Cd is allowed.

By setting the second clutch C2 and the third clutch C3 to the coupled state, as described in the fourth gear position, each of the elements of the first planetary gear mechanism PGS1 and the second planetary gear mechanism PGS2 becomes in the locked state in which these elements cannot relatively rotate, and the rotational speed of the second coupled body Ra-Sd becomes "1". By setting the first clutch C1 to the coupled state, the rotational speed of the third coupled body Cc-Cd becomes "1". Accordingly, in the fourth planetary gear mechanism PGS4, the carrier Cd (the eleventh element) and the sun gear Sd (the twelfth element) become the same speed of "1" and become in the locked state in which these elements cannot relatively rotate.

Thereby, the rotational speed of the ring gear Rd (the tenth element) of the fourth planetary gear mechanism PGS4 coupled to the output gear 3 becomes "1" as "6th" shown in FIG. 3, and the sixth gear position is established.

To establish the seventh gear position, the first brake B1, which is a two-way clutch, is set to the reverse rotation preventing state, the third brake B3 is set to the fixed state, and the first clutch C1 and the second clutch C2 are set to the coupled state.

By setting the first brake B1 to the reverse rotation preventing state, the normal rotation of the third coupled body Cc-Cd is allowed. By setting the third brake B3 to the fixed state, the rotational speed of the sun gear Sb (the sixth element) of the second planetary gear mechanism PGS2 becomes "0".

By setting the second clutch C2 to the coupled state, the rotational speed of the ring gear Rb (the fourth element) of the second planetary gear mechanism PGS2 becomes "1", which is the same as the rotational speed of the sun gear Sa (the first element) of the first planetary gear mechanism PGS1, and the rotational speed of the first coupled body Cc-Cb-Rc, which includes the carrier Cb (the fifth element) of the second planetary gear mechanism PGS2, becomes i/(i+1). By setting the first clutch C1 to the coupled state, the rotational speed of the third coupled body Cc-Cd becomes "1", which is the same as the rotational speed of the sun gear Sa (the first element) of the first planetary gear mechanism PGS1 coupled to the input shaft 2.

Thereby, the rotational speed of the ring gear Rd (the tenth element) of the fourth planetary gear mechanism PGS4 coupled to the output gear 3 becomes "7th" shown in FIG. 3, and the seventh gear position is established.

To establish the eighth gear position, the first brake B1, which is a two-way clutch, is set to the reverse rotation preventing state, the third brake B3 is set to the fixed state, and the first clutch C1 and the third clutch C3 are set to the coupled state.

By setting the first brake B1 to the reverse rotation preventing state, the normal rotation of the third coupled body Cc-Cd is allowed. By setting the third brake B3 to the fixed state, the rotational speed of the sun gear Sb (the sixth element) of the second planetary gear mechanism PGS2 becomes "0".

By setting the third clutch C3 to the coupled state, the rotational speed of the second coupled body Ra-Sd becomes "0", which is the same as the rotational speed of the sun gear Sb (the sixth element) of the second planetary gear mechanism PGS2. Also, by setting the first clutch C1 to the coupled state, the rotational speed of the third coupled body Cc-Cd becomes "1", which is the same as the rotational speed of the sun gear Sa (the first element) of the first planetary gear mechanism PGS1.

Thereby, the rotational speed of the ring gear Rd (the tenth element) of the fourth planetary gear mechanism PGS4 coupled to the output gear 3 becomes "8th" shown in FIG. 3, and the eighth gear position is established.

To establish the ninth gear position, the first brake B1, which is a two-way clutch, is set to the reverse rotation preventing state, the third brake B3 and the fourth brake B4 are set to the fixed state, and the first clutch C1 is set to the coupled state.

By setting the first brake B1 to the reverse rotation preventing state, the normal rotation of the third coupled body Cc-Cd is allowed. By setting the third brake B3 to the fixed state, the rotational speed of the sun gear Sb (the sixth element) of the second planetary gear mechanism PGS2 becomes "0". By setting the fourth brake B4 to the fixed state, the rotational speed of the ring gear Rb (the fourth element) of the second planetary gear mechanism PGS2 also becomes "0". Therefore, each of the elements Sb, Cb and Rb of the second planetary gear mechanism PGS2 becomes in the locked state in which these elements cannot relatively rotate, and the rotational speed of the first coupled body Ca-Cb-Rc, which includes the carrier Cb (the fifth element) of the second planetary gear mechanism PGS2, also becomes "0".

By setting the first clutch C1 to the coupled state, the rotational speed of the third coupled body Cc-Cd becomes "1", which is the same as the rotational speed of the sun gear Sa (the first element) of the first planetary gear mechanism PGS1.

Thereby, the rotational speed of the ring gear Rd (the tenth element) of the fourth planetary gear mechanism PGS4 coupled to the output gear 3 becomes "9th" shown in FIG. 3, and the ninth gear position is established.

To establish the tenth gear position, the first brake B1, which is a two-way clutch, is set to the reverse rotation preventing state, the fourth brake B4 is set to the fixed state, and the first clutch C1 and the third clutch C3 are set to the coupled state.

By setting the first brake B1 to the reverse rotation preventing state, the normal rotation of the third coupled body Cc-Cd is allowed. By setting the fourth brake B4 to the fixed state, the rotational speed of the ring gear Rb (the fourth element) of the second planetary gear mechanism PGS2 becomes "0".

By setting the third clutch C3 to the coupled state, the second coupled body Ra-Sd and the sun gear Sb (the sixth element) of the second planetary gear mechanism PGS2 rotate at the same speed. Also, by setting the first clutch C1 to the coupled state, the rotational speed of the third coupled body Cc-Cd becomes "1", which is the same as the rotational speed of the sun gear Sa (the first element) of the first planetary gear mechanism PGS1.

Thereby, the rotational speed of the ring gear Rd (the tenth element) of the fourth planetary gear mechanism PGS4 coupled to the output gear 3 becomes "10th" shown in FIG. 3, and the tenth gear position is established.

To establish the reverse gear position, the first brake B1, which is a two-way clutch, and the third brake B3 are set to the fixed state, and the second clutch C2 is set to the coupled state.

By setting the first brake B1 to the fixed state, the rotational speed of the third coupled body Cc-Cd becomes "0". Also, by setting the third brake B3 to the fixed state and the second clutch C2 to the coupled state, the rotational speed of the first coupled body Ca-Cb-Rc becomes i/(i+1).

Thereby, the rotational speed of the ring gear Rd (the tenth element) of the fourth planetary gear mechanism PGS4 coupled to the output gear 3 becomes "Rvs" which is reverse rotation shown in FIG. 3, and the reverse gear position is established.

FIG. 4 also indicates the change gear ratio (the rotational speed of the input shaft 2/the rotational speed of the output gear 3) corresponding to each gear position in the case where the gear ratio h of the first planetary gear mechanism PGS1 is 2.734, the gear ratio i of the second planetary gear mechanism PGS2 is 1.614, the gear ratio j of the third planetary gear mechanism PGS3 is 2.681, and the gear ratio k of the fourth planetary gear mechanism PGS4 is 1.914, and the common ratio (the ratio of the change gear ratio between each gear position, calculated by dividing the change gear ratio corresponding to a predetermined gear position by the change gear ratio of a gear position that is one position higher speed side than the predetermined gear ratio). According to these ratios, it is understood that the common ratio can be adequately set.

Next, referring to FIGS. 5 to 8, an example of the two-way clutch used as the first brake B1 (the switching mechanism) in the automatic transmission TM is described.

The first brake B1 is constituted with a two-way clutch switchable between the fixed state in which the third coupled body Cc-Cd is fixed to the transmission case 1 and the reverse rotation preventing state which allows the normal rotation and prevents the reverse rotation of the third coupled body Cc-Cd. A two-way clutch TW with the configuration shown in FIGS. 5 to 8 is used as such a two-way clutch.

Figure 5:
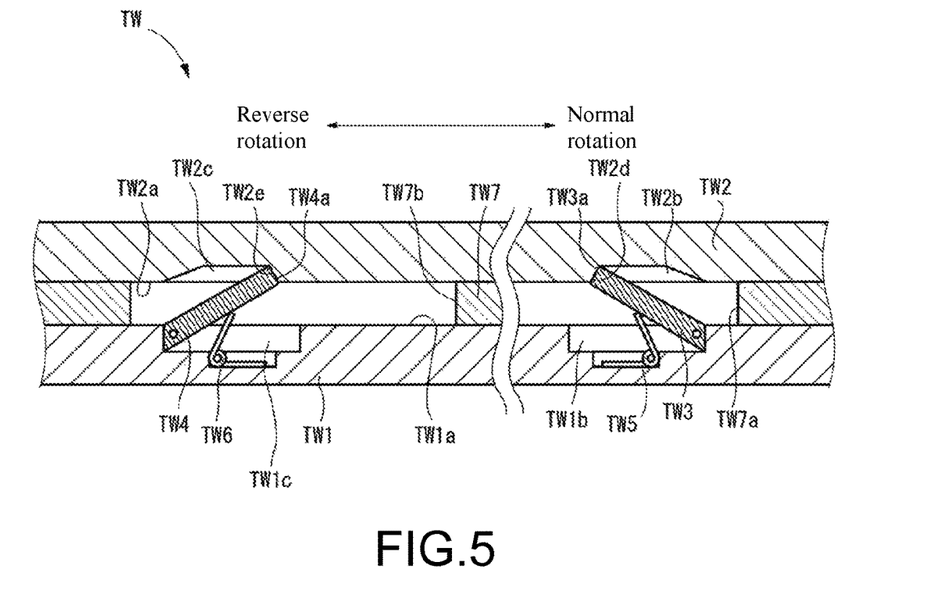
FIG. 5 is a cross-sectional view illustrating the fixed state of the two-way clutch of the automatic transmission of FIG. 1.
Figure 6:
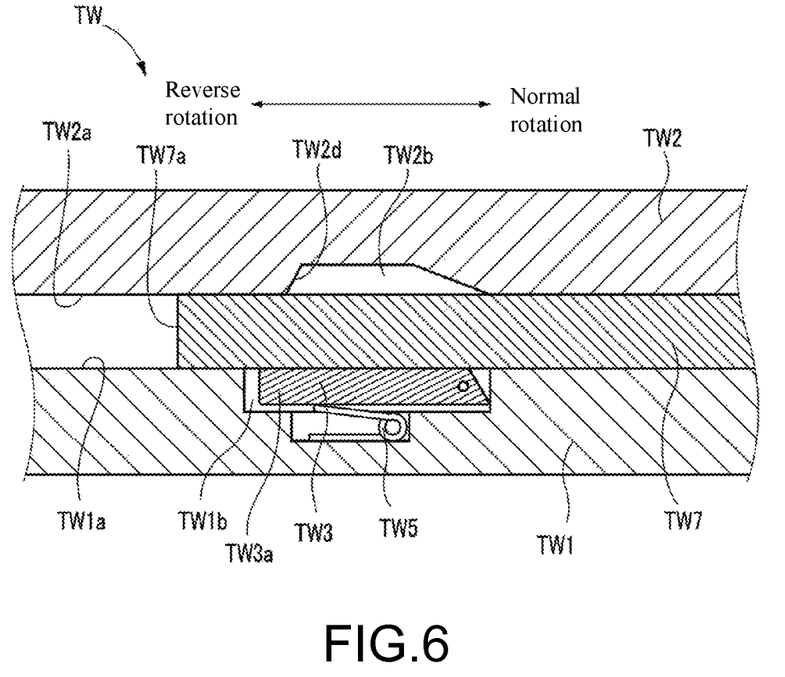
FIG. 6 is a cross-sectional view illustrating the reverse rotation preventing state of the principal part of the two-way clutch of the automatic transmission of FIG. 1.

As shown in the cross-sectional views of FIGS. 5 and 6, the two-way clutch TW includes a fixed plate TW1 fixed to the transmission case 1 and a rotating plate TW2 coupled to the third coupled body Cc-Cd.

Figure 7:
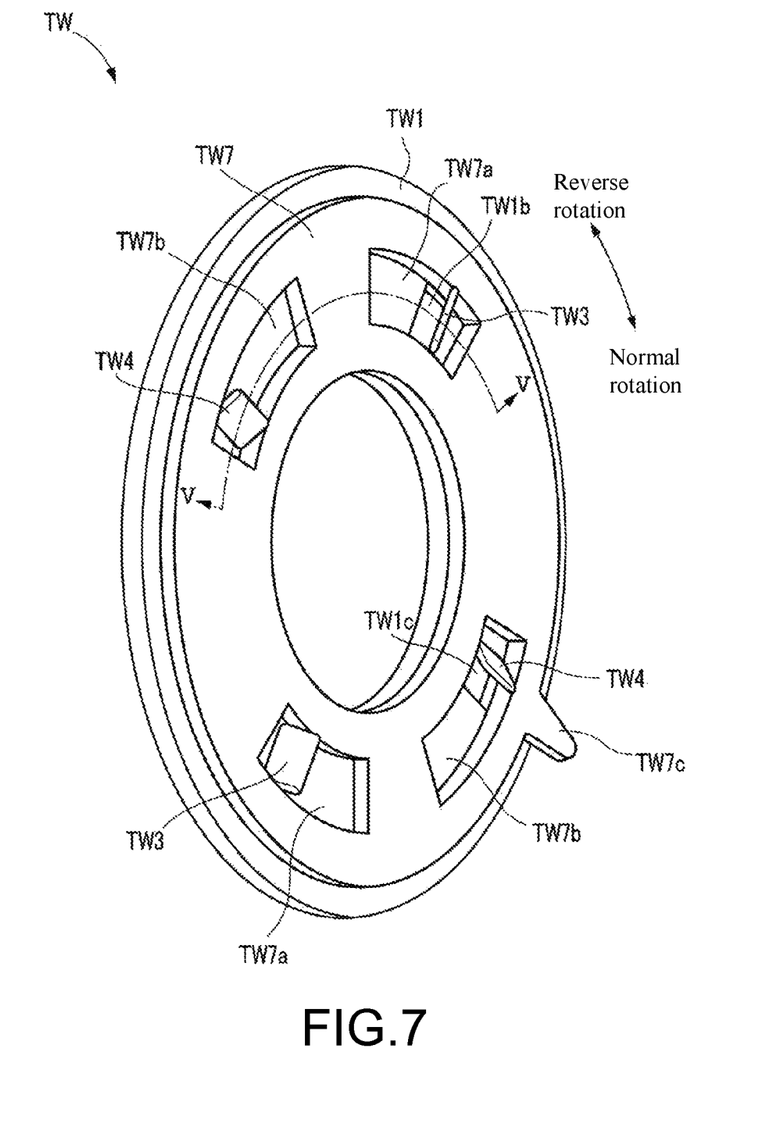
FIG. 7 is a perspective view illustrating the fixed state of the two-way clutch of the automatic transmission of FIG. 1.
Figure 8:
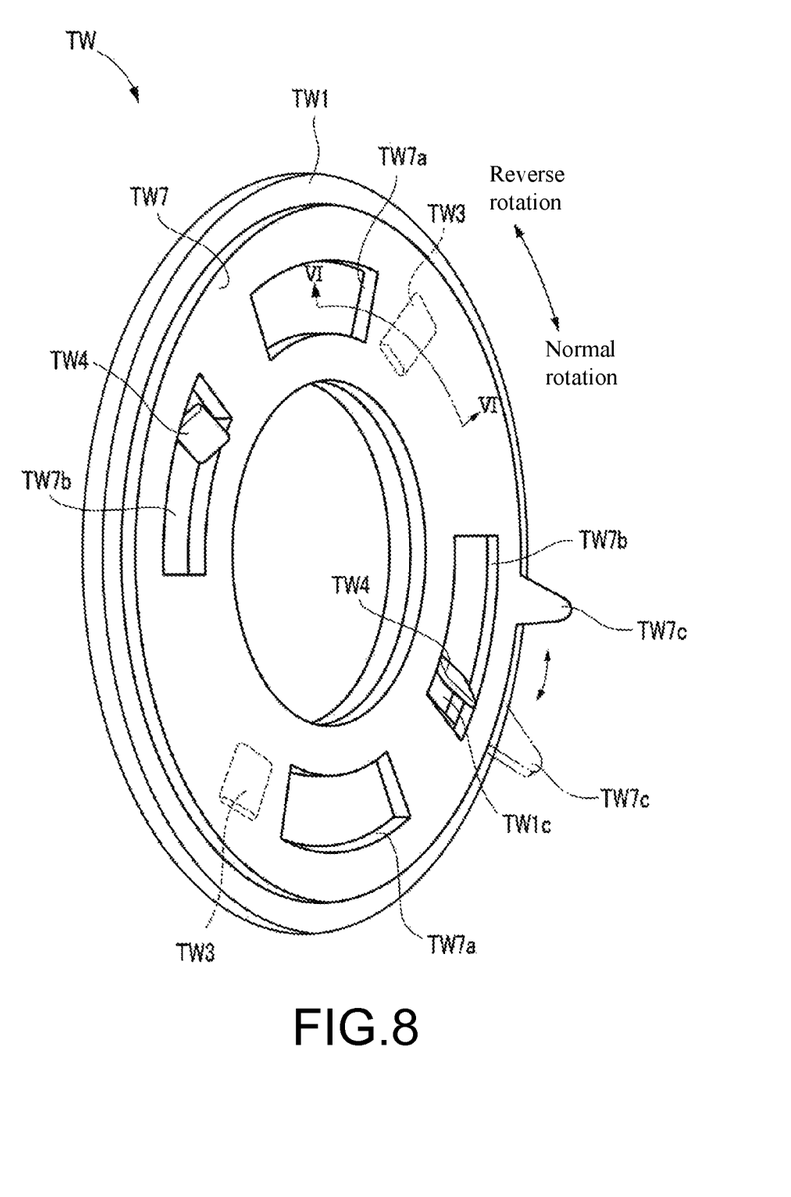
FIG. 8 is a perspective view illustrating the reverse rotation preventing state of the two-way clutch of the automatic transmission of FIG. 1.

As shown in FIGS. 7 and 8, the fixed plate TW1 is formed into an annular shape (donut shape). The rotating plate TW2, omitted in FIGS. 7 and 8, is also formed into an annular shape (donut shape) similar to the fixed plate TW1. The fixed plate TW1 and the rotating plate TW2 are concentrically disposed.

As shown in FIG. 5, the first housing portion TW1b and the second housing portion TW1c are formed as recesses on a counter surface TW1a of the fixed plate TW1 facing the rotating plate TW2. A plate-shaped no mal rotation preventing member TW3 is storably disposed to the first housing portion TW1b. A plate-shaped reverse rotation preventing member TW4 is storably disposed to the second housing portion TW1c.

An end portion of the normal rotation preventing member TW3 on the other side in the peripheral direction (the direction in which the rotating plate TW2 reversely rotates) is a swing end portion TW3a. The swing end portion TW3a is swingable with an end portion on the peripheral direction side (the direction in which the rotating plate TW2 is normally rotates) as a pivot.

An end portion of the reverse rotation preventing member TW4 on the peripheral direction side (the direction in which the rotating plate TW2 normally rotates) is a swing end portion TW4a. The swing end portion TW4a is swingable with an end portion on the other side in the peripheral direction (the direction in which the rotating plate TW2 is reversely rotates) as a pivot.

The first spring TW5 is disposed between the bottom surface of the first housing portion TW1b and the normal rotation preventing member TW3. The first spring TW5 energizes the swing end portion TW3a of the normal rotation preventing member TW3 so that the swing end portion TW3a is protruded from the first housing portion TW1b.

The second spring TW6 is disposed between the bottom surface of the second housing portion TW and the reverse rotation preventing member TW4. The second spring TW6 energizes the swing end portion TW4a of the reverse rotation preventing member TW4 so that the swing end portion TW4a is protruded from the second housing portion TW1c.

The first recess TW2b is disposed at the location corresponding to the normal rotation preventing member TW3 on a counter surface TW2a of the rotating plate TW2 facing the fixed plate TW1. The second recess TW2c is disposed at the location corresponding to the reverse rotation preventing member TW4 on the counter surface TW2a of the rotating plate TW2.

The first engagement portion TW2d is disposed on the first recess TW2b on the other side in the peripheral direction (reverse rotation direction side) of the rotating plate TW2. The first engagement portion TW2d is formed into a stage shape engageable with the swing end portion TW3a of the normal rotation preventing member TW3.

The second engagement portion TW2e is disposed on the first recess TW2c on the peripheral direction side (normal rotation direction side) of the rotating plate TW2. The second engagement portion TW2e is formed into a stage shape engageable with the swing end portion TW4a of the reverse rotation preventing member TW4.

As shown in FIGS. 5 and 7, both the normal rotation and the reverse rotation of the rotating plate TW2 are prevented when the swing end portion TW3a of the normal rotation preventing member TW3 and the first engagement portion TW2d are in the engageable state, and the swing end portion TW4a of the reverse rotation preventing member TW4 and the second engagement portion TW2e are in the engageable state.

Accordingly, the fixed state in the two-way clutch TW is the state in which the swing end portion TW3a is engaged with the corresponding first engagement portion TW2d and the swing end portion TW4a is engaged with the corresponding second engagement portion TW2e.

A switching plate TW7 is sandwiched between the fixed plate TW1 and the rotating plate TW2. As show in FIGS. 7 and 8, the switching plate TW7 is also formed into an annular shape (donut shape). The first notch holes TW7a and the second notch holes TW7b are disposed on the switching plate TW7 at the locations corresponding to the normal rotation preventing member TW3 and the reverse rotation preventing member TW4.

A protrusion TW7c protruding outward in the radial direction is disposed on the outer rim of the switching plate TW7. As shown in FIG. 8, the switching plate TW7 is swingable with respect to the fixed plate TW1.

The first notch holes TW7a corresponding to the normal rotation preventing member TW3 move in the circumferential direction from the positions corresponding to the normal rotation preventing members TW3 when the switching plate TW7 is swung from the fixed state shown in FIG. 7 to the state shown in FIG. 8. Therefore, the normal rotation preventing members TW3 are pushed by the switching plate TW7 and housed inside the first housing portion TW1b while opposing the energizing force of the first spring TW5 (refer to FIG. 6). Thereby, the engagement of the swing end portion TW3a of the normal rotation preventing members TW3 and the first engagement portion TW2d is prevented. Accordingly, the rotation of the rotating plate TW2 to the normal rotation side is allowed.

On the contrary, the second notch holes TW7b corresponding to the reverse rotation preventing members TW4 remain at the positions corresponding to the reverse rotation preventing members TW4 even the switching plate TW7 is swung from the fixed state shown in FIG. 7 to the state shown in FIG. 8. Therefore, the reverse rotation preventing members TW4 are not pushed by the switching plate TW7 and protruded from the second housing portions TW1c by the energizing force of the second springs TW6 (refer to FIG. 5). Thereby, the swing end portion TW4a of the reverse rotation preventing member TW4 is engaged with the second engagement portion TW2e. Accordingly, the rotation of the rotating plate TW2 to the reverse rotation side is prevented.

The reverse rotation preventing state in the two-way clutch TW is the state in which the rotation of the rotating plate TW2 to the normal rotation side is allowed and the rotation to the reverse rotation side is prevented in the abovementioned manner.

Also, the second notch holes TW7b corresponding to the reverse rotation preventing members TW4 move from the positions corresponding to the reverse rotation preventing members TW4 to the circumferential direction when the switching plate TW7 is moved from the position indicated with the two-dot dashed line in FIG. 8 to further the normal rotation side. Therefore, the reverse rotation preventing members TW4 are pushed by the switching plate TW7 and housed inside the second housing portions TW1c while opposing to the energizing force of the second springs TW6. Thereby, the engagement of the swing end portion TW4a of the reverse rotation preventing member TW4 and the second engagement portion TW2e is prevented. Accordingly, the rotation of the rotating plate TW2 to the reverse rotation side is allowed.

On the contrary, the first notch holes TW7a corresponding to the normal rotation preventing members TW3 remain at the position corresponding to the normal rotation preventing members TW3 even the switching plate TW7 is moved from the position indicated with the two-dot dashed line in FIG. 8 to further the normal rotation side. Therefore, the normal rotation preventing members TW3 are not pushed by the switching plate TW7 and protruded from the first housing portions TW1b by the energizing force of the first springs TW5 (refer to FIG. 5). Thereby, the swing end portion TW3a of the normal rotation preventing member TW3 is engaged with the first engagement portion TW2d. Accordingly, the rotation of the rotating plate TW2 to the normal rotation side is prevented.

The normal rotation preventing state in the two-way clutch TW is the state in which the rotation of the rotating plate TW2 to the reverse rotation side is allowed and the rotation to the normal rotation side is prevented in the abovementioned manner.

Figure 9A:
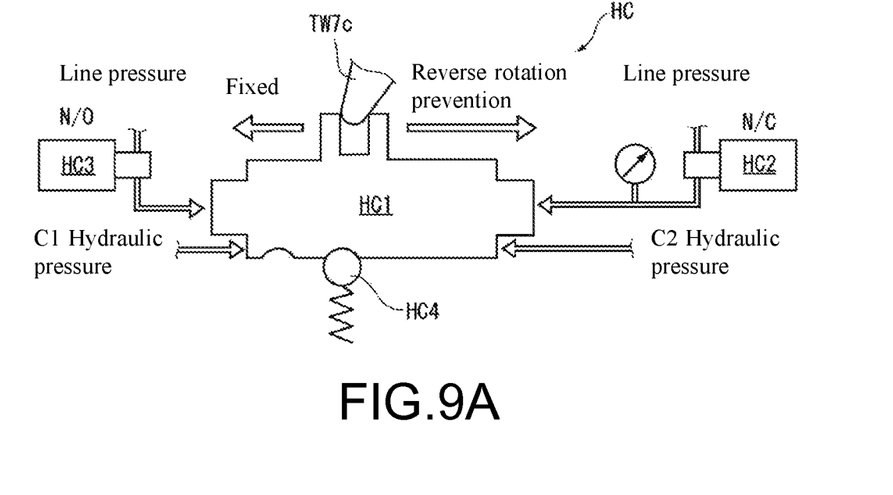
Figure 9B:
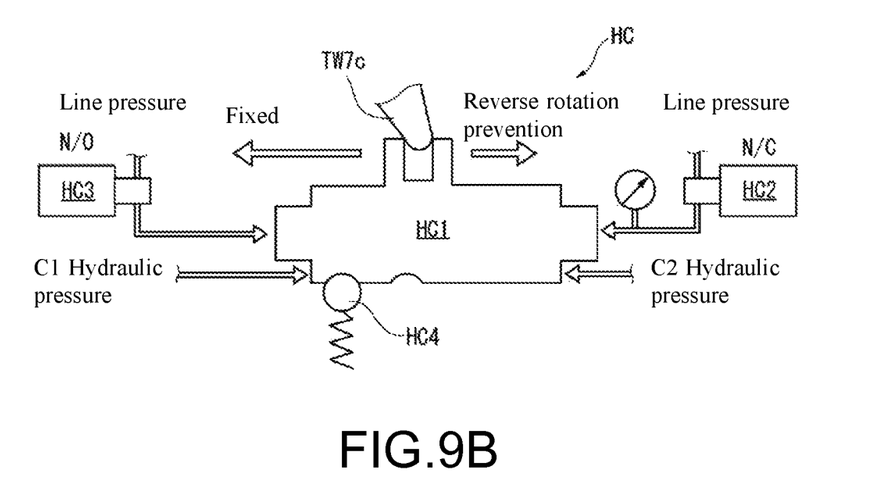

Next, referring to FIGS. 9A and 9B, an example of the switching control mechanism for switching the engagement mechanisms according to signals from the control part ECU is described.

As shown in FIGS. 9A and 9B, a hydraulic pressure control circuit HC includes a slider HC1 engaging with the protrusion TW7c disposed on the switching plate TW7. When the slider HC1 is positioned on the right side of FIGS. 9A and 9B, the two-way clutch TW is switched to the reverse rotation preventing state. When the slider HC1 is positioned on the left side of FIGS. 9A and 9B, the two-way clutch TW is switched to the fixed state.

The right side of the slider HC1 on the drawing is configured to be able to supply line pressure via the first valve HC2 constituted with a solenoid valve. The left side of the slider HC1 on the drawing is configured to be able to supply line pressure via the second valve HC3 constituted with a solenoid valve. The first valve HC2 is of a normal closed type, and the second valve HC3 is of a normal opened type.

The first valve HC2 and the second valve HC3 are opened and closed according to the signals from the control part ECU. That is, the two-way clutch TW is controlled by the control part ECU via the hydraulic pressure control circuit HC.

Hydraulic pressure supplied to the second clutch C2 is supplied to the right side of the slider HC1 on the drawing on a different surface from the surface receiving the line pressure. Hydraulic pressure supplied to the first clutch C1 is supplied to the left side of the slider HC1 on the drawing on a different surface from the surface receiving the line pressure. The hydraulic pressure for the first clutch C1 and the second clutch C2 supplied to the slider HC1 is used as a reverse preparation pressure.

Also, a detent mechanism HC4 is disposed to the slider HC1 so that it is configured to prevent switching between the fixed state shown in FIG. 9A and the reverse rotation preventing state shown in FIG. 9B unless the line pressure exceeds a predetermined pressure.

According to the hydraulic pressure control circuit HC, the two-way clutch TW is switched to the fixed state as the slider HC1 is moved to the left side on the drawing by opening the first valve HC2 and closing the second valve HC3 so as to make the line pressure higher than or equal to a predetermined switching hydraulic pressure which is set based on the pressure difference of the hydraulic pressure of the first clutch C1 and of the second clutch C2 and the engaging force of the detent mechanism HC4.

On the contrary, the two-way clutch TW is switched to the reverse rotation preventing state as the slider HC1 is moved to the right side of the drawing by closing the first valve HC2 and opening the second valve HC3, so as to make the line pressure higher than or equal to the predetermined switching hydraulic pressure mentioned above.

Next, referring to FIGS. 1, 9A, 9B and 10 to 11, the control performed by the control part ECU of the automatic transmission TM when the hydraulic pressure supplied to the hydraulic pressure control circuit HC temporarily rises is described in detail.

As shown in FIG. 1, the automatic transmission TM includes the hydraulic pressure control circuit HC switching the first brake B1 according to the instruction from the control part ECU.

The hydraulic pressure control circuit HC has a hydraulic pressure detector HC5 detecting the hydraulic pressure supplied to the hydraulic pressure control circuit HC, a hydraulic pressure adjustment part HC6 including a hydraulic pressure adjustment valve that is capable of adjusting the hydraulic pressure of the hydraulic pressure control circuit HC, and a stroke sensor HC7 recognizing the position of the slider HC1 (refer to FIGS. 9A and 9B).

The control part ECU receives information of the shift position from the shift lever SL, information of the hydraulic pressure from the hydraulic pressure detector HC5 and information of the position of the slider HC1 from the stroke sensor HC7.

The control part ECU of the automatic transmission TM configured as above performs the control described below when switching the state of the first brake B1, which is the two-way clutch TW, to the fixed state.

Figure 10:
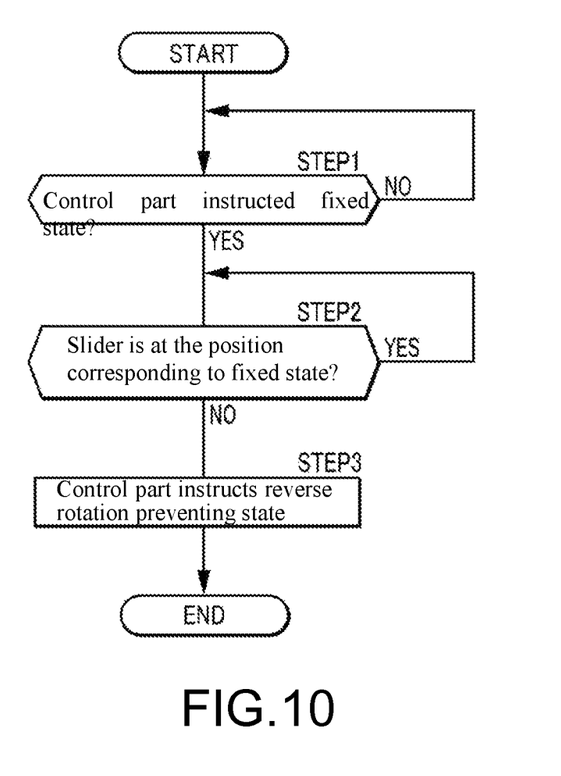
FIG. 10 is a flowchart illustrating the process performed when the control part of the automatic transmission of FIG. 1 recognizes that an abnormality has occurred to the hydraulic pressure control circuit.

As shown in the flowchart of FIG. 10, firstly, the control part ECU determines whether it has instructed the hydraulic pressure control circuit HC to switch the first brake B1 (the switching mechanism), which is the two-way clutch TW, to the fixed state or not (FIG. 10/STEP 1).

If the control part EUC has not instructed to switch the first brake B1 to the fixed state (NO at STEP 1), the control part ECU repeats the determination until the instruction is given. This determination is repeated, for example, every 10 msec.

On the contrary, if the control part ECU has instructed to switch the first brake B1 to the fixed state (YES at STEP 1), the control part ECU determines whether the slider HC1 of the hydraulic pressure control circuit HC is at the position corresponding to the fixed state (refer to FIG. 9A) or not (FIG. 10/STEP 2). This determination is repeated, for example, every 10 msec.

Figure 11:
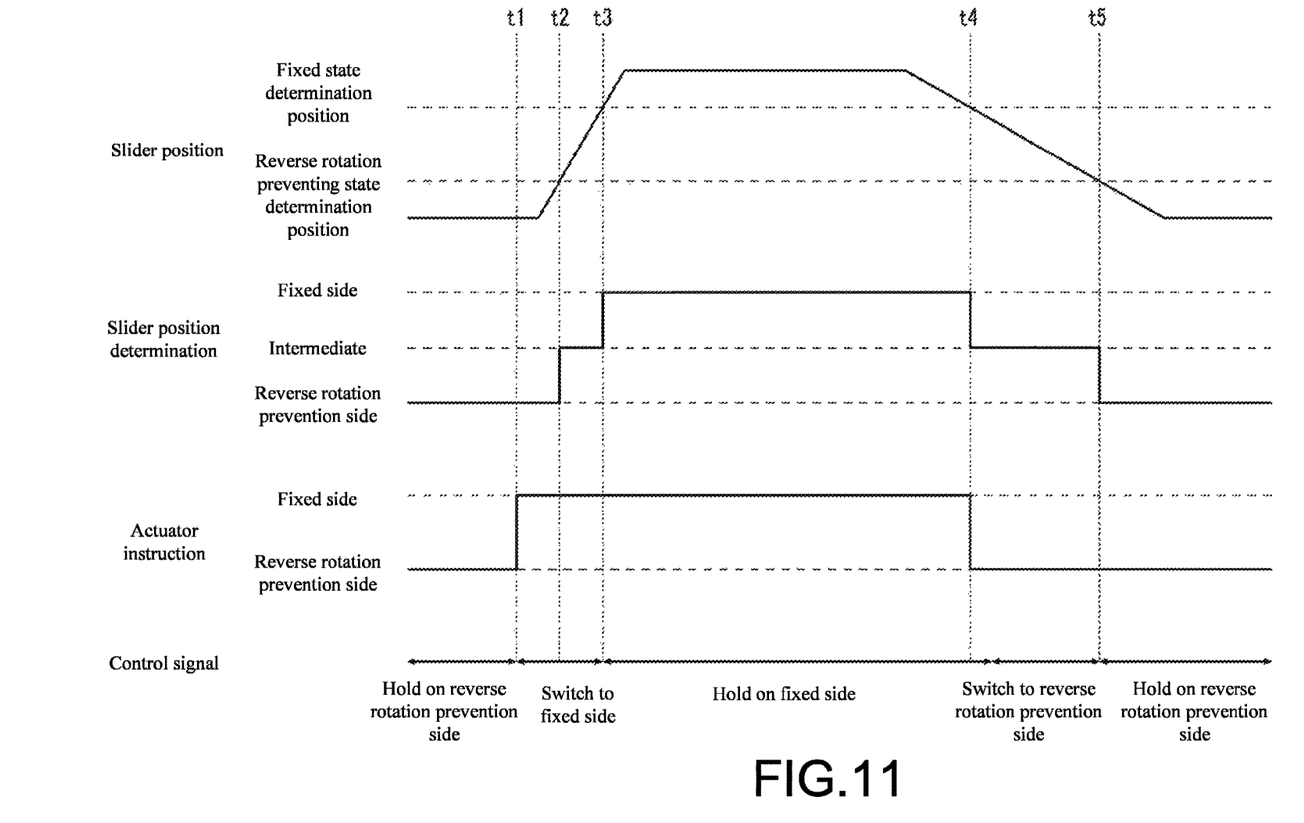
FIG. 11 is a timing chart illustrating the signals of the control part of the automatic transmission of FIG. 1 processes and the state of the hydraulic pressure control circuit.

In the automatic transmission TM, the control part ECU switches the state of the first brake B1 (two-way clutch TW) from the state in which the first brake B1 is held on the reverse rotation prevention side to the state in which the first brake B1 is held on the fixed side, by transmitting a signal to the hydraulic pressure adjustment part HC6 of the hydraulic pressure control circuit HC (FIG. 11/Time W.

The hydraulic pressure control circuit HC, which is an actuator for moving the first brake B1, moves the slider HC1 from the reverse rotation prevention side to the fixed side according to the signal from the control part ECU. At this time, the slider HC1 starts moving slightly late after receiving the signal from the control part ECU because the slider HC1 is driven by hydraulic pressure.

Then, the control part ECU recognizes that the first brake B1, which is a two-way clutch, is switched to the fixed state (FIG. 11/Time t3) passing through an intermediate state (FIG. 11/Time t2) by determining the position of the slider HC1 based on a signal from the stroke sensor HC7.

Therefore, in the determinations in STEPs 1 and 2, specifically, the control part ECU firstly determines whether the signal for switching the two-way clutch TW to the fixed state has been transmitted or not (STEP 1), and then, the control part ECU determines whether the slider HC1 is at the position corresponding to the fixed state or not based on the signal from the stroke sensor HC7 (STEP 2).

If the position of the slider HC1 is determined to be on the fixed side (YES at STEP 2), the control part ECU repeats the determination until it is determined that the position of the slider HC1 is changed.

On the contrary, if the position of the slider HC1 is determined not to be on the fixed side, the control part ECU instructs the hydraulic pressure control circuit HC to switch the first brake B1, which is the two-way clutch TW, to the reverse rotation preventing state and finishes the process (FIG. 10/STEP 3).

In the automatic transmission TM, it is possible that the hydraulic pressure supplied to the hydraulic pressure control circuit HC temporarily changes by the effect such like shaking on oil. Thereby, the slider HC1 may be moved from the position corresponding to the fixed state to the position corresponding to the reverse rotation preventing state (FIG. 11/Time t4 to t5) even though the control part ECU recognizes that it has switched the first brake B1, which is a two-way clutch, to the fixed state (that is, FIG. 10/YES at STEP 1).

The control part ECU, however, transmits the signal for switching the first brake B1 to the reverse rotation preventing state at the time of detecting the movement of the slider HC1 (FIG. 11/Time t4), and based on the signal, the hydraulic pressure control circuit HC moves the slider HC1 to the position corresponding to the reverse rotation preventing state of the first brake B1 (FIG. 11/Time t4 to t5).

Therefore, in the automatic transmission TM, it is prevented that the first brake B1 is actually in the reverse rotation preventing state even though the control part ECU recognizes that it has switched the first brake B1, which is a two-way clutch, to the fixed state. Because such a situation is prevented, the slider HC1 remains at the position corresponding to the reverse rotation preventing state after the cause of abnormality of the hydraulic pressure is resolved.

As a result, the slider HC1 is never forcibly moved to the fixed state (that is, forcibly switched to the fixed state) while a differential rotation is occurring. That is, the components of the first brake B1 are hardly damaged under such a circumstance.

Accordingly, the first brake B1, which is the two-way clutch TW, is hardly damaged even if the hydraulic pressure supplied to the hydraulic pressure control circuit HC temporarily changes, according to the automatic transmission TM.

The embodiment depicted on the drawings has been described above, but, the present invention is not limited thereto.

For example, in the above embodiment, the automatic transmission TM is configured to be capable of changing speed in 10 gear positions. However, the present invention may be applied to any automatic transmission that is capable of changing speed in a plurality of gear positions.

Also, in the above embodiment, the switching of the shift positions is made by the shift lever operation. However, the switching method of the shift positions is not limited thereto, and, for example, it is possible to configure to change the shift positions by pressing buttons, etc. For example, it is possible to configure to determine the selected shift position from a pressing signal of a button.

What is claimed is:
1. An automatic transmission, comprising:
an input member disposed inside a casing and rotated by a driving force transmitted from a drive source;
a planetary gear mechanism having a plurality of elements rotatable inside the casing;
a plurality of engagement mechanisms switchable to a coupled state in which the elements are coupled to one another, or switchable to a fixed state in which the elements are fixed to the casing, comprising
a switching mechanism switchable between the fixed state and a reverse rotation preventing state that allows a normal rotation and prevents a reverse rotation of corresponding elements among the plurality of elements;
an output member outputting a rotation;
a control part controlling the engagement mechanisms; and
a hydraulic pressure control circuit switching the engagement mechanisms according to a hydraulic pressure that is supplied according to a first signal from the control part, comprising
a slider movable by the hydraulic pressure supplied and
a stroke sensor recognizing a position of the slider and transmitting a second signal indicating that the slider is at the position to the control part,
wherein
the automatic transmission is configured to output a rotation of the input member to the output member while changing speed in a plurality of gear positions with the planetary gear mechanism and the engagement mechanisms, and
the switching mechanism is switched between the reverse rotation preventing state and the fixed state by movement of the slider, and
after the control part transmits the first signal for switching the switching mechanism to the fixed state and recognizes that the switching mechanism has been switched to the fixed state, and when the control part receives the second signal that the slider moves from a position corresponding to the fixed state to a position corresponding to the reverse rotation preventing state, the control part switches the switching mechanism to the reverse rotation preventing state.

* * * * *